(12) United States Patent
Pace

(10) Patent No.: US 9,722,522 B2
(45) Date of Patent: Aug. 1, 2017

(54) METHOD FOR CONTROLLING TORQUE IN PERMANENT MAGNET MOTOR DRIVES

(71) Applicant: CANRIG DRILLING TECHNOLOGY LTD., Houston, TX (US)

(72) Inventor: Gary Pace, Cypress, TX (US)

(73) Assignee: CANRIG DRILLING TECHNOLOGY LTD., Houston, TX (US)

( * ) Notice: Subject to any disclaimer, the term of this patent is extended or adjusted under 35 U.S.C. 154(b) by 0 days.

(21) Appl. No.: 14/676,514

(22) Filed: Apr. 1, 2015

(65) Prior Publication Data

US 2015/0288310 A1 Oct. 8, 2015

Related U.S. Application Data

(60) Provisional application No. 61/974,168, filed on Apr. 2, 2014.

(51) Int. Cl.
| | |
|---|---|
| *H02P 21/18* | (2016.01) |
| *H02P 21/14* | (2016.01) |
| *H02P 6/08* | (2016.01) |
| *H02P 21/22* | (2016.01) |

(52) U.S. Cl.
CPC .............. *H02P 21/148* (2013.01); *H02P 6/08* (2013.01); *H02P 21/18* (2016.02); *H02P 21/22* (2016.02)

(58) Field of Classification Search
CPC .. H02P 21/148; H02P 21/0035; H02P 21/146; H02P 6/08
See application file for complete search history.

(56) References Cited

U.S. PATENT DOCUMENTS

| | | | | |
|---|---|---|---|---|
| 4,677,360 | A | * 6/1987 | Garces | .................. H02P 21/085 318/803 |
| 4,707,651 | A | 11/1987 | Schauder | |
| 4,885,518 | A | * 12/1989 | Schauder | ................ H02P 21/06 318/798 |
| 4,926,105 | A | 5/1990 | Mischenko et al. | |
| 5,739,664 | A | * 4/1998 | Deng | .................... B60L 15/025 318/599 |
| 5,844,397 | A | * 12/1998 | Konecny | ................ E21B 43/128 318/811 |
| 5,905,346 | A | * 5/1999 | Yamada | .................... B60K 6/26 180/65.21 |
| 6,014,006 | A | * 1/2000 | Stuntz | ..................... H02P 21/13 318/799 |
| 6,163,137 | A | * 12/2000 | Wallace | .................. H02P 9/105 318/821 |

(Continued)

OTHER PUBLICATIONS

U.S. Appl. No. 14/676,514, Muhammad S. Islam.*

(Continued)

*Primary Examiner* — Shawki S Ismail
*Assistant Examiner* — Muhammad S Islam
(74) *Attorney, Agent, or Firm* — Adolph Locklar

(57) ABSTRACT

A method for limiting the torque of a permanent magnet AC motor includes a torque limit controller. The torque limit controller at least in part bases the torque limit on a selected direct voltage limit. The selected direct voltage limit may be used in combination with other torque limit conditions to generate the torque demand for the AC motor.

18 Claims, 3 Drawing Sheets

(56) References Cited

U.S. PATENT DOCUMENTS

| | | | | |
|---|---|---|---|---|
| 6,288,515 | B1* | 9/2001 | Hiti | H02P 21/08 318/716 |
| 6,965,212 | B1* | 11/2005 | Wang | H02P 21/0035 318/700 |
| 7,960,940 | B2* | 6/2011 | Kariatsumari | H02P 21/0035 318/400.01 |
| 2003/0006723 | A1* | 1/2003 | Sul | H02P 21/146 318/127 |
| 2006/0066275 | A1* | 3/2006 | Thunes | H02P 21/09 318/432 |
| 2008/0116842 | A1* | 5/2008 | Cheng | B60L 15/025 318/807 |
| 2009/0030645 | A1 | 1/2009 | Gotz et al. | |
| 2009/0154034 | A1 | 6/2009 | Tallam | |
| 2010/0128502 | A1* | 5/2010 | Kawamoto | B60L 11/00 363/34 |
| 2011/0031922 | A1 | 2/2011 | Sakai et al. | |
| 2013/0009572 | A1* | 1/2013 | Byun | H02P 21/06 318/14 |
| 2013/0009574 | A1* | 1/2013 | Yoo | H02P 21/0035 318/400.02 |
| 2013/0093372 | A1 | 4/2013 | Thyagarajan | |

OTHER PUBLICATIONS

International Search Report and Written Opinion issued in International Patent Application No. PCT/US2015/023903, Jul. 10, 2015 (13 pages).

\* cited by examiner

METHOD FOR CONTROLLING TORQUE IN PERMANENT MAGNET MOTOR DRIVES

CROSS-REFERENCE TO RELATED APPLICATIONS

This application is a non-provisional application which claims priority from U.S. provisional application No. 61/974,168, filed Apr. 2, 2014, which is incorporated by reference herein in its entirety.

TECHNICAL FIELD/FIELD OF THE DISCLOSURE

The present disclosure relates generally to control of electric motors, and specifically to controlling torque in permanent magnet AC motors.

BACKGROUND OF THE DISCLOSURE

Alternating current (AC) electric motors rely on alternating currents passed through induction windings within the stator to cause rotation of the rotor. So-called three phase AC motors include three matched sets of windings positioned radially about the stator. By supplying sinusoidal AC power to each of the sets of windings such that each set receives an alternating current offset by 120 degrees, a torque can be imparted on the rotor as it rotates.

Unlike a brushed DC motor, output speed in an AC motor is controlled by the frequency of the current sent to the stator windings. In order to control output torque, and thus speed, a variable frequency drive (VFD) is used to vary the current fed to the AC motor. Because the inductive reactance of the stator windings is proportional to the frequency applied to the winding, increased voltage is necessary to maintain a relatively constant current within the windings, and thus a relatively constant output torque. Additionally, in a permanent magnet AC motor, as the permanent magnetic field of the permanent magnets of the rotor rotates, a voltage known as a back EMF or counter EMF is induced into the stator windings. The current supplied to the windings of the AC motor is thus dependent on the voltage supplied to the motor less the back EMF voltage.

In order to properly drive the AC motor, VFD's often operate using one of two control methods. In a volts/Hz control or flux control scheme, the VFD varies the output speed of the motor by supplying AC power to the stator windings at a particular frequency and voltage. For a given desired torque, voltage is proportionally related to the frequency by a so-called "voltage-to-frequency" or "volts/Hz" ratio. By using closed-loop feedback, a VFD using volts/Hz can maintain motor speed in changing conditions. This simple control scheme, however, is inherently slow in its response to rapid changes in demand speeds, as it relies on control of voltages and frequencies rather than current directly. Additionally, this simple form of volts/Hz may not be usable in a permanent magnet motor control system.

With the rapid advancement in low-cost, high speed microprocessor technology, VFDs utilizing field-oriented control (FOC) models are increasingly popular. In FOC, the current supplied to the phases of the AC motor is decoupled into torque and flux components acting on the rotor in a rotating reference frame. Thus, each of these currents can be independently controlled. Current supplied to the phases of the motor are measured or derived and transformed into the torque-flux space (utilizing, for example, a Clarke/Park transformation), a closed-loop feedback model can be created to control each of these currents continuously. The processor then back-transforms the torque and flux components into three phase currents. The three phase currents are fed to a three phase inverter which outputs pulse-width modulated signals to each set of windings in the motor.

In an AC motor, even under FOC, as the speed of the permanent magnet motor is increased, the voltage generated by the fixed magnetic field (EMF) increases proportionally. At some speed, the voltage generated by the motor exceeds the maximum voltage that can be produced by the drive that is controlling the motor. If operation above this speed is desired, it is necessary to modify the current vector applied to the motor to maintain the desired torque, and control the terminal voltage of the motor to a value less than the maximum drive output voltage, thus operating in a flux weakening mode. In such a situation, the EMF may interfere with the operation of the VFD in the flux weakening mode.

SUMMARY

The present disclosure provides for a method for limiting torque demand of a three phase permanent magnet AC motor having a rotor and stator driven by a three phase current generated by a variable frequency drive. The method may include measuring the three phase current supplied to the permanent magnet AC motor. The method may include transforming the measured three phase current signal into a two-phase signal projected onto a two-axis rotating reference frame The phase components of the two-phase signal may define a feedback quadrature current and a feedback direct current. The method may include calculating an estimated rotor speed and estimated rotor position. The method may include calculating a speed error signal by subtracting the estimated rotor speed from a target speed. The method may include calculating, using a speed controller, a torque demand from the speed error signal. The method may include calculating, using a torque limit controller, a limited torque demand. The limited torque demand may be calculated at least in part with respect to a selected maximum direct voltage. The method may include calculating a quadrature current error signal by subtracting the feedback quadrature current from a quadrature demand current. The method may include calculating, using an $I_q$ controller, a quadrature voltage from the quadrature current error signal. The method may include calculating a direct current error signal by subtracting the feedback direct current from a demand direct current. The method may include calculating, using an $I_d$ controller, a direct voltage from the direct current error signal. The method may include transforming the quadrature and direct voltages into a three phase voltage signal. The method may include modulating a DC voltage with a three phase inverter to supply three phase current corresponding to the three phase voltage signal to the permanent magnet AC motor.

The present disclosure also provides for a method for limiting torque demand of a permanent magnet AC motor having a rotor and stator driven by a current supplied to each phase of the permanent magnet AC motor generated by a variable frequency drive. The method may include measuring the current supplied to the permanent magnet AC motor. The method may include transforming the measured current signal into a two-phase signal projected onto a two-axis rotating reference frame. The phase components of the two-phase signal may define a feedback quadrature current and a feedback direct current. The method may include calculating an estimated rotor speed and estimated rotor position. The method may include calculating a speed error signal by subtracting the estimated rotor speed from a target speed. The method may include calculating, using a speed controller, a torque demand from the speed error signal. The method may include calculating, using a torque limit controller, a limited torque demand. The method may include calculating a quadrature current error signal. The method may include calculating a quadrature voltage from the quadrature current error signal. The method may include calculating a direct current error signal. The method may include calculating a direct voltage from the direct current error signal. The method may include transforming the quadrature and direct voltages into a voltage signal corresponding to each phase of the permanent magnet AC motor. The method may include modulating a DC voltage with a three phase inverter to supply current to each phase of the permanent magnet AC motor corresponding with the voltage signal.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
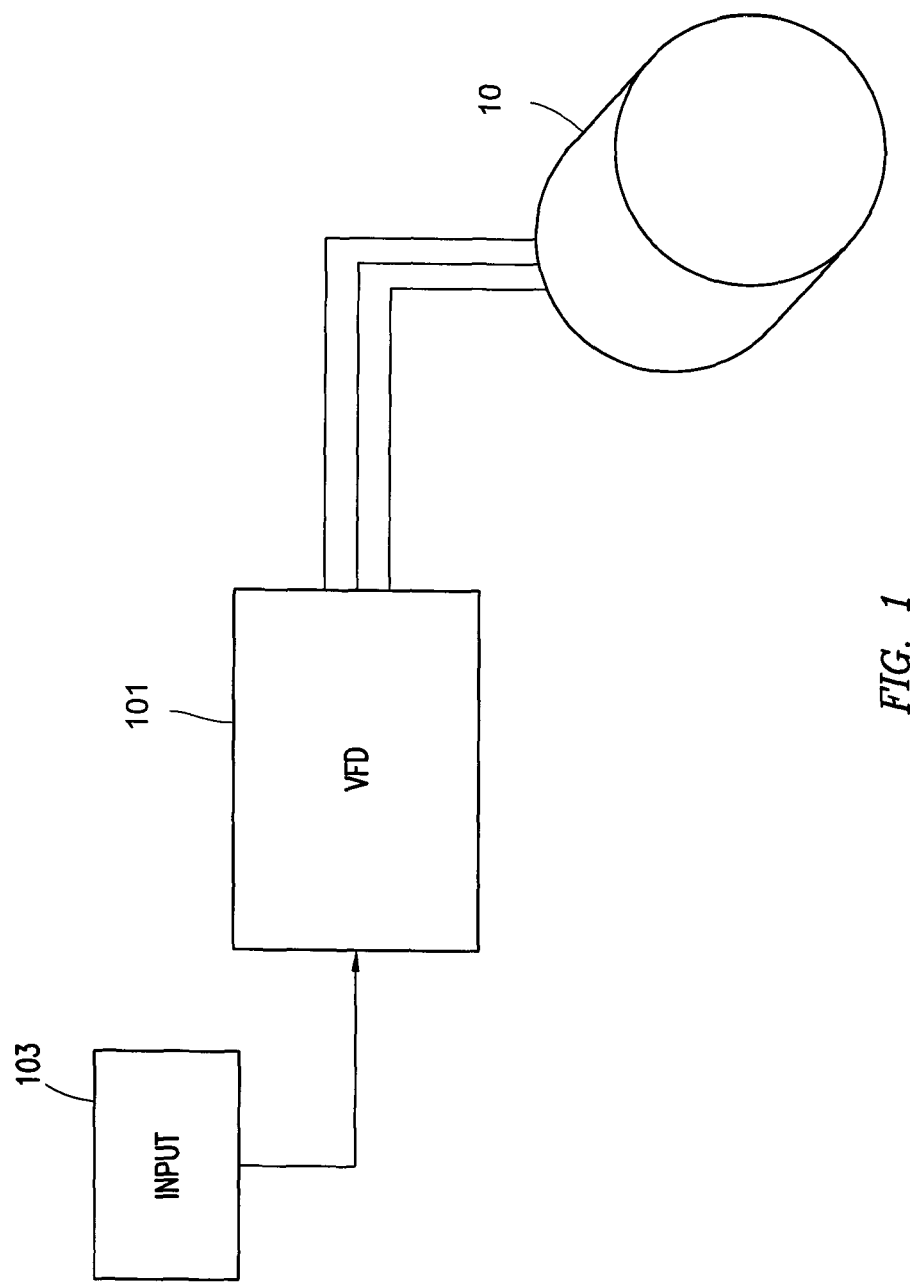
FIG. 1 depicts a block diagram of a three phase permanent magnet AC motor controlled by a VFD utilizing torque limiting consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts a block diagram of three phase AC motor 10 controlled by VFD 101. Although described herein as a three phase AC motor, one having ordinary skill in the art with the benefit of this disclosure will understand that three phase AC motor 10 may instead be a polyphase AC motor without deviating from the scope of this disclosure. One having ordinary skill in the art with the benefit of this disclosure will understand that the specific methods and equations described herein may be modified to account for other numbers of motor phases. VFD 101 may be positioned to output three phase AC power to the stator windings (not shown) of AC motor 10 in response to input parameters 103. Input parameters 103 may include, without limitation, at least one of torque demand, speed demand, and maximum drive voltage.

In the case of a permanent magnet motor, the interaction of current, flux, voltage, and speed are defined by the model voltage equation as follows:

$$v_s = R_s \cdot i_s + l_s \cdot \dot{i}_s + j\omega_0 l_s \cdot i_s + \dot{\phi}_r + j\omega_0 \cdot \phi_r,$$

where $v_s$ is the stator voltage vector, $R_s$ is the stator resistance, $i_s$ is the stator current vector, $l_s$ is the stator leakage inductance, $\phi_r$ is the total rotor flux vector, and $\omega_0$ is the synchronous frequency given by:

$$\phi_0 = P_p \times \omega_r,$$

Where $P_p$ is the number of pole pairs per phase, and $\omega_r$ is the speed of the rotor. Total rotor flux $\phi_r$ may be given by:

$$\phi_r = \phi_{pm} + L_m \cdot i_s$$

where $\phi_{pm}$ is the permanent magnet flux (the reference frame is chosen such that the permanent magnet flux is entirely real), and $L_m$ is the mutual stator-rotor inductance. As used in the equations, "_" indicates a vector quantity, and the "·" operator is the first order time derivative.

Substituting the flux equation into the voltage equation, and the definition that $\phi_m$ is entirely real (direct or d-axis), the voltage equation evaluates to:

$$\begin{bmatrix} v_d \\ v_q \end{bmatrix} = \begin{bmatrix} R_s + pL_d & -\omega_0 L_q \\ \omega_0 L_d & R_s + pL_q \end{bmatrix} \begin{bmatrix} i_d \\ i_q \end{bmatrix} + \begin{bmatrix} 0 \\ \omega_0 \Phi_m \end{bmatrix},$$

where p is the d/dt operator, $L_d$ is the total inductance in the d-axis, $L_q$ is the total inductance in the quadrature or q-axis, each given by:

$$L_d = (l_s + L_{dm})$$

$$L_q = (l_s + L_{qm})$$

where $L_{dm}$ is the d-axis component of $L_m$ and $L_{qm}$ is the q-axis component of $L_m$.

Torque supplied by the motor may be given by:

$$T_e = 3P_p(\phi_r \times i_s),$$

which, from the definition that $\phi_m$ is entirely real, can be expressed as:

$$T_e = 3P_p(\phi_m \cdot i_q + (L_d - L_q)i_d i_q)$$

Thus, speed can be expressed by the following equation:

$$\dot{\omega}_r = \frac{1}{(J_m + J_L)}(T_e - T_m(\omega_r) - T_L(\omega_r)),$$

where $J_m$ and $J_L$ are the motor and load inertias respectively, $T_m(\omega_r)$ is the motor loss torque as a function of speed, and $T_L(\omega_r)$ is the load torque as a function of speed.

The voltage and flux equations can thus be combined into the following extended state-space format:

$$\begin{bmatrix} \dot{i}_d \\ \dot{i}_q \end{bmatrix} = \begin{bmatrix} \left(\frac{-R_s}{L_d}\right) & \left(\omega_0 \frac{L_q}{L_d}\right) \\ \left(-\omega_0 \frac{L_d}{L_q}\right) & \left(\frac{-R_s}{L_q}\right) \end{bmatrix} \begin{bmatrix} i_d \\ i_q \end{bmatrix} + \begin{bmatrix} \left(\frac{V_d}{L_d}\right) \\ \left(\frac{V_q - \omega_0 \phi_m}{L_q}\right) \end{bmatrix}.$$

Figure 2:
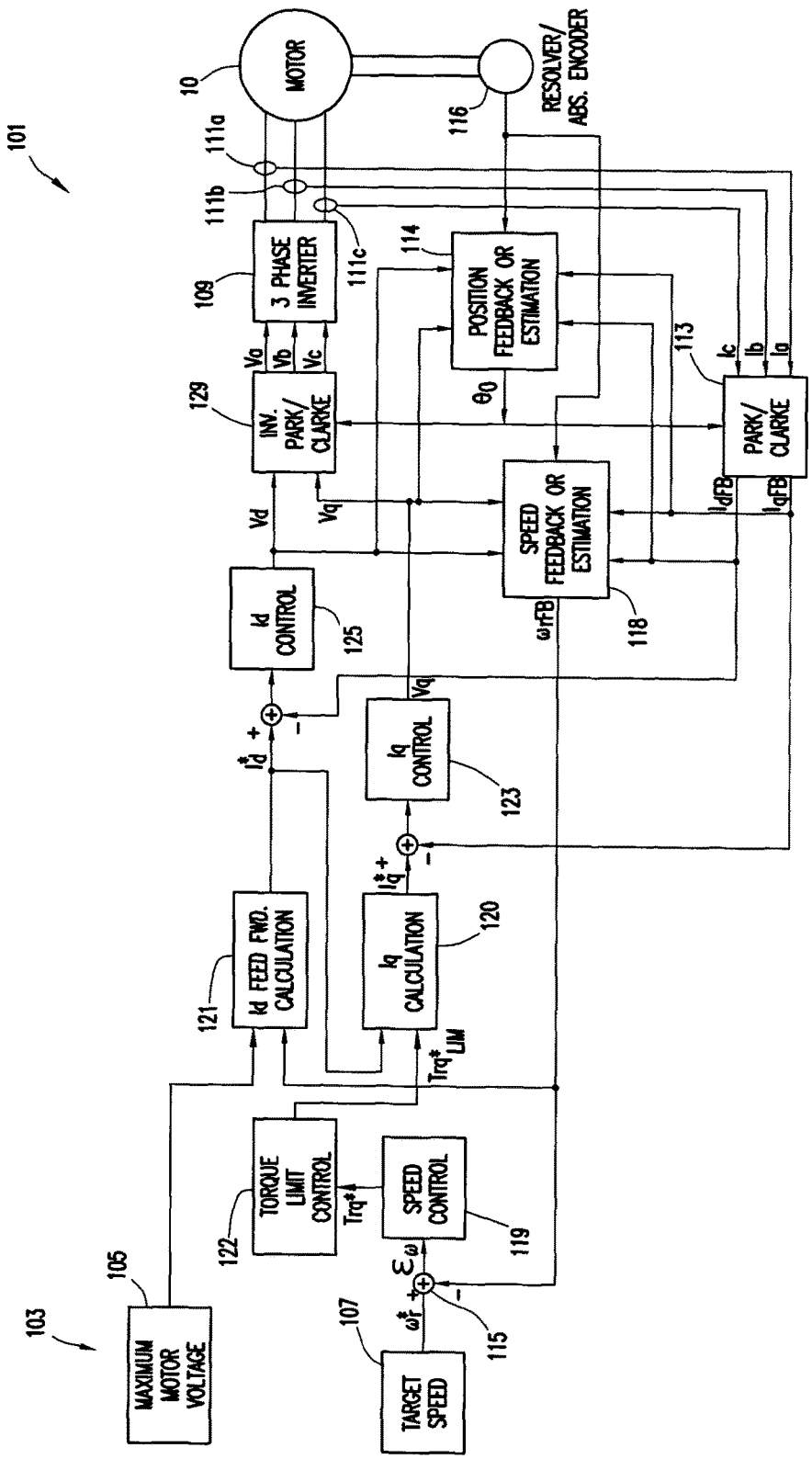
FIG. 2 depicts a block diagram of a VFD utilizing torque limiting consistent with embodiments of the present disclosure.

FIG. 2 depicts a block diagram of VFD 101 of FIG. 1. In this embodiment, input parameters 103 shown are maximum drive voltage 105 and target speed 107. Maximum drive voltage 105 may be, as the name suggests, the maximum voltage available to VFD 101 to output to AC motor 10. Since AC motor 10 is driven by PWM signals from three phase inverter 109, maximum drive voltage 105 is a DC voltage. Maximum drive voltage 105 may be determined by the AC voltage available to be rectified by a rectifier into the DC voltage used to drive VFD 101.

As VFD 101 drives AC motor 10, VFD 101 measures the currents $i_a$, $i_b$, $i_c$ supplied to each of the stator windings phases using, for example, ammeters 111a-c. In some embodiments wherein AC motor 10 is ungrounded and supplied with balanced three phase currents, the current supplied to one of the three windings may be derived from measurements of the other two windings. The three current signals $i_a$, $i_b$, $i_c$ are transformed into a two-phase projection of the currents in a rotating reference frame, namely feedback quadrature current $i_{q\_FB}$ and feedback direct current $i_{d\_FB}$. This transformation may be accomplished by, for example, Park/Clarke transformation 113. Park/Clarke transformation 113 uses estimated position $\theta_0$ generated by position estimator 114. Position estimator 114 may calculate estimated position $\theta_0$ from a signal generated by resolver/encoder 116, which may be attached to the output shaft of AC motor 10.

The signal generated by resolver/encoder may also be used by speed estimator 118 to calculate estimated rotor speed $\omega_r$. In other embodiments, the two-phase projected currents may be used to calculate estimated position $\theta_0$ and rotor speed $\omega_r$. In other embodiments, two-phase projected currents in a stationary reference frame as calculated by a Clarke transformation alone may be used to calculate estimated position $\theta_0$ and rotor speed $\omega_r$. In some embodiments, an open loop controller may be utilized to estimate rotor speed $\omega_r$, using, for example, feedback from voltage supplied to AC motor 10.

Furthermore, in some embodiments, one or more of position estimator 114 and speed estimator 118 may incorporate feedback into the position and rotor speed calculations. In such embodiments, parameters including but not limited to direct voltage $v_d$, quadrature voltage $v_q$, feedback direct current $i_{d\_FB}$, and/or feedback quadrature current $i_{q\_FB}$ (as discussed below) may be utilized in the estimation of estimated position $\theta_0$ and rotor speed $\omega_r$.

Rotor speed $\omega_r$ is subtracted from target speed 107 at 115 to generate a speed error signal $\epsilon_\omega$ which may be used by speed controller 119 to generate a torque demand Trq*. However, the above equations used to determine torque demand Trq* imply no intrinsic limit to the maximum torque that AC motor 10 is capable of producing in the given implementation. In reality, the actual maximum torque is affected by, for example and without limitation, the mechanical constraints of AC motor 10, the maximum current available to AC motor 10, and the maximum power available to AC motor 10. Thus, torque demand Trq* as calculated by speed controller 119 may demand a greater torque from AC motor 10 than AC motor 10 is capable of producing.

Figure 3:
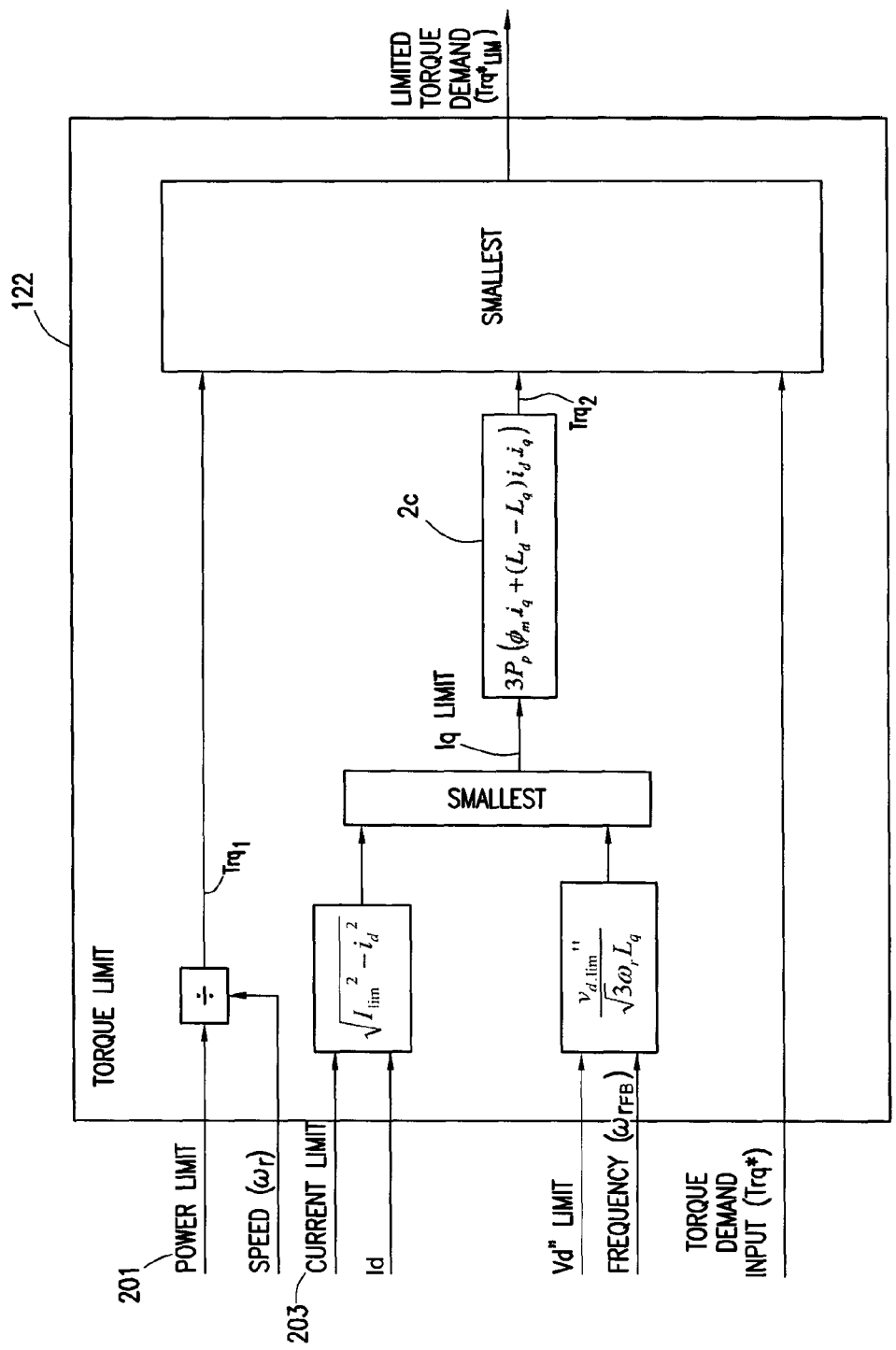
FIG. 3 depicts a block diagram of the torque limit calculator of FIG. 2.

To account for such an eventuality, torque limit controller 122 is positioned to calculate a limited torque demand Trq*$_{LIM}$. FIG. 3 depicts a block diagram for torque limit controller 122. Torque limit controller 122, as depicted, may account for each of the above listed factors which affect maximum torque of AC motor 10. Torque limit controller 122 may determine limited torque demand Trq*$_{LIM}$ by selecting the smallest torque value calculated among each of the above listed factors and torque demand Trq*. For example, torque limit controller 122 calculates a first torque limit Trq$_1$ by dividing the maximum power 201 available to AC motor 10 by rotor speed $\omega_r$.

In order to account for other factors, an $i_q$ limit may be calculated by selecting the smallest $i_q$ calculated with respect to the factor. For example, the maximum current 203 and $i_d$ may be used to calculate an $i_q$ limit according to:

$$i_{q.lim} = \sqrt{I_{lim}^2 - i_d^2},$$

where $I_{lim}$ is the maximum current 203 available to AC motor 10.

At the same time, inherent mechanical constraints may be accounted for as well. For example, when operating in a field weakening mode, the voltage developed by quadrature inductance may, for example, prevent a field weakening controller to operate normally and maintain terminal voltage control. By limiting this direct voltage $v_d''$ to a selected value, terminal voltage control may be maintained. In some embodiments, $v_d''$ may be limited to approximately half of the available drive output voltage. The $i_q$ limit associated with the limited direct voltage $v_{d.lim}''$ may be calculated according to:

$$i_{q.lim} = \frac{v_{d.lim}''}{\sqrt{3}\,\omega_r L_q}.$$

Torque limit calculator 122 may then use the smaller of the $i_q$ limits with the following torque calculation to determine a second torque limit Trq$_2$:

$$T_e = 3P_p(\varphi_m \cdot i_q + (L_d - L_q) i_d i_q)$$

as above.

Torque limit calculator 122 may then select the smallest of the first torque limit Trq$_1$, second torque limit Trq$_2$, and the calculated torque demand Trq* to determine limited torque demand Trq*$_{LIM}$.

The calculated limited torque demand Trq*$_{LIM}$ which is subsequently used by $I_q$ calculator 120 to calculate demand quadrature current $i_q$*. Quadrature current can be described as the component of current which induces the component of the stator magnetic field separated by 90 degrees from the rotor. Likewise, direct current can be described as the component of current which induces the component of the stator magnetic field aligned with the rotor. Thus, the quadrature component generally has a greater effect on rotor torque than the direct component. However, the direct component may contribute to torque in, for example, salient machines where $L_d$ and $L_q$ are significantly different. Thus demand direct current $i_d$* may also be taken into account by $I_q$ calculator 120 in determining demand quadrature component $i_q$*.

Feedback quadrature current $i_{q\_FB}$ is subtracted from demand quadrature current $i_q$*, and the calculated error may be fed into $I_q$ controller 123. $I_q$ controller 123, which may operate as a PI controller or "bang-bang" controller as understood in the art, thus calculates quadrature voltage $v_q$, i.e. the quadrature component of the voltage to be supplied to AC motor 10.

In a similar manner, $I_d$ feed forward calculator 121 generates a demand direct current $i_d$*. In typical operation, it may be desired to maintain demand direct current $i_d$* at zero since maximum torque results from a magnetic field aligned 90 degrees offset from the rotor. Feedback direct current $i_{d\_FB}$ is then subtracted from demand direct current $i_d$* to generate an error to be fed into $I_d$ control 125. $I_d$ control 125, which may operate as a PI controller or "bang-bang" controller as understood in the art, then generates direct voltage $v_d$.

Direct and quadrature voltages $v_d$, $v_q$ are then reverse transformed by inverse Park/Clarke transformation 129 from the rotating reference frame to the three phase voltages $v_a$, $v_b$, $v_c$. The three phase voltages $v_a$, $v_b$, $v_c$ are fed into three phase inverter 109, which using, for example, PWM, modulates the supplied DC voltage into variable frequency AC current to AC motor 10.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method for limiting torque demand of a three phase permanent magnet AC motor having a rotor and stator driven by a three phase current generated by a variable frequency drive, the method comprising:
   measuring the three phase current supplied to the permanent magnet AC motor;
   transforming the measured three phase current signal into a two-phase signal projected onto a two-axis rotating reference frame, the phase components of the two-phase signal defining a feedback quadrature current and a feedback direct current;
   calculating an estimated rotor speed and estimated rotor position;
   calculating a speed error signal by subtracting the estimated rotor speed from a target speed;
   calculating, using a speed controller, a torque demand from the speed error signal;
   calculating, using a torque limit controller, a limited torque demand, the limited torque demand calculated at least in part with respect to a selected maximum direct voltage;
   calculating a quadrature current error signal by subtracting the feedback quadrature current from a quadrature demand current;
   calculating, using an $I_q$ controller, a quadrature voltage from the quadrature current error signal;
   calculating a direct current error signal by subtracting the feedback direct current from a demand direct current;
   calculating, using an $I_d$ controller, a direct voltage from the direct current error signal;
   transforming the quadrature and direct voltages into a three phase voltage signal; and
   modulating a DC voltage with a three phase inverter to supply three phase current corresponding to the three phase voltage signal to the permanent magnet AC motor.

2. The method of claim 1, wherein the quadrature demand current is calculated using the limited torque demand and a demand direct current and the demand direct current is calculated from a maximum drive voltage, the direct voltage, and the estimated rotor speed.

3. The method of claim 1, wherein the limited torque demand is calculated at least in part with respect to a selected maximum direct voltage.

4. The method of claim 1, wherein the limited torque demand is calculated by the torque limit controller by:
   calculating a first torque limit with respect to a maximum power available to the AC motor;
   calculating a second torque limit with respect to a maximum current available to the AC motor;
   calculating a third torque limit with respect to the selected maximum direct voltage; and
   determining the least of the first torque limit, the second torque limit, the third torque limit, and the torque demand.

5. The method of claim 4, wherein the first torque limit is calculated according to:

$$Trq_1 = \frac{P}{\omega_r},$$

where P is the maximum power available to the AC motor and $\omega r$, is the estimated rotor speed.

6. The method of claim 4, wherein the second torque limit is calculated by:
   determining a quadrature current limit according to:

$$i_{q.lim} = \sqrt{I_{lim}^2 - i_d^2},$$

where $I_{lim}$ is the maximum current available to the AC motor, $i_d$ is the demand direct current; and
   calculating the second torque limit with respect to the quadrature current limit.

7. The method of claim 4, wherein the third torque limit is calculated by:
   selecting the direct voltage limit;
   determining a quadrature current limit according to:

$$i_{q.lim} = \frac{v''_{d.lim}}{\sqrt{3}\,\omega_r L_q},$$

where vd.lim" is the selected direct voltage limit, $\omega r$, is the estimated rotor speed, and $L_q$ is the total quadrature inductance; and
   calculating the third torque limit with respect to the quadrature current limit.

8. The method of claim 7, wherein the selected direct voltage limit is approximately half of the maximum drive voltage.

9. The method of claim 1, further comprising transforming the measured three phase current signal into a two-phase signal projected onto a two-axis rotating reference frame, the phase components of the two-phase signal defining a feedback quadrature current and a feedback direct current.

10. The method of claim 9, wherein the measured three phase signal is projected onto a two-axis rotating reference frame by a Park/Clarke transformation.

11. The method of claim 1, wherein the Iq controller and the Id controller operate as PI controllers.

12. The method of claim 1, wherein the three phase inverter supplies a pulse-width modulated current to each phase of the permanent magnet AC motor.

13. The method of claim 1, wherein the three phase current is measured by ammeters positioned to detect current in each of the three phases of current supplied to the permanent magnet AC motor.

14. The method of claim 1, wherein the three phase current is measured by ammeters positioned to detect current in two of the three phases of current supplied to the permanent magnet AC motor, and the current in the third phase is calculated from the two currents detected by the ammeters.

15. The method of claim 1, wherein the estimated rotor speed and the estimated rotor position are calculated from a resolver or an encoder coupled to an output shaft of the permanent magnet AC motor.

16. The method of claim 1, wherein the estimated rotor speed and the estimated rotor position are calculated from the measured three-phase current signal.

17. The method of claim 16, wherein the estimated rotor speed and the estimated rotor position are calculated further using the quadrature and direct voltages, and the feedback quadrature and direct currents.

18. A method for limiting torque demand of a permanent magnet AC motor having a rotor and stator driven by a current supplied to each phase of the permanent magnet AC motor generated by a variable frequency drive, the method comprising:

measuring the current supplied to the permanent magnet AC motor;

transforming the measured current signal into a two-phase signal projected onto a two-axis rotating reference frame, the phase components of the two-phase signal defining a feedback quadrature current and a feedback direct current;

calculating an estimated rotor speed and estimated rotor position;

calculating a speed error signal by subtracting the estimated rotor speed from a target speed;

calculating, using a speed controller, a torque demand from the speed error signal;

calculating, using a torque limit controller, a limited torque demand;

calculating a quadrature current error signal;

calculating a quadrature voltage from the quadrature current error signal;

calculating a direct current error signal;

calculating a direct voltage from the direct current error signal;

transforming the quadrature and direct voltages into a voltage signal corresponding to each phase of the permanent magnet AC motor; and modulating a DC voltage with a three phase inverter to supply current to each phase of the permanent magnet AC motor corresponding with the voltage signal.

* * * * *